United States Patent
Yalamanchili (10) Patent No.: US 11,582,340 B2
(45) Date of Patent: Feb. 14, 2023

(54) MOBILE COMPUTING DEVICE NOTIFICATION MODE DETERMINATION

(71) Applicant: T-Mobile USA, Inc., Bellevue, WA (US)

(72) Inventor: Kalyan Yalamanchili, Kirkland, WA (US)

(73) Assignee: T-Mobile USA, Inc., Bellevue, WA (US)

(*) Notice: Subject to any disclaimer, the term of this patent is extended or adjusted under 35 U.S.C. 154(b) by 1 day.

(21) Appl. No.: 17/019,103

(22) Filed: Sep. 11, 2020

(65) Prior Publication Data

US 2020/0412865 A1 Dec. 31, 2020

Related U.S. Application Data

(63) Continuation of application No. 15/920,079, filed on Mar. 13, 2018, now Pat. No. 10,778,833.

(51) Int. Cl.
*H04M 1/72454* (2021.01)
*G06F 9/54* (2006.01)
*H04M 1/72484* (2021.01)

(52) U.S. Cl.
CPC ........ *H04M 1/72454* (2021.01); *G06F 9/542* (2013.01); *H04M 1/72484* (2021.01)

(58) Field of Classification Search
CPC .......... H04M 1/72454; H04M 1/72484; G06F 9/542
See application file for complete search history.

(56) References Cited

U.S. PATENT DOCUMENTS

| | | |
|---|---|---|
| 7,881,283 B2 | 2/2011 | Cormier et al. |
| 9,348,607 B2 | 5/2016 | Chaudhri et al. |
| 9,420,083 B2 | 8/2016 | Roberts et al. |
| 10,114,897 B1 | 10/2018 | Ledet |
| 10,185,492 B2 | 1/2019 | Cho et al. |

(Continued)

FOREIGN PATENT DOCUMENTS

| | | |
|---|---|---|
| EP | 2950182 A1 | 2/2015 |
| WO | WO 2019/177999 | 9/2019 |

OTHER PUBLICATIONS

International Search Report and Written Opinion in International Application No. PCT/US2019/021674 dated May 10, 2019; 20 Pages.

*Primary Examiner* — Ankur Jain
*Assistant Examiner* — Angelica M Perez
(74) *Attorney, Agent, or Firm* — Knobbe, Martens, Olson & Bear, LLP (57) ABSTRACT

Systems and methods are described for providing a notification mode determination service. A notification mode determination service may apply various criteria to determine a mode for displaying a notification on a mobile computing device, and may analyze responses to previously displayed notifications in order to determine the criteria to apply, prioritize the application of the criteria, and identify preferred notification modes. Notifications may be displayed using audio feedback, visual feedback, haptic feedback, or combinations thereof, and may be deferred until a particular time or condition is reached. Notification modes may be determined based on factors such as a foreground software application, a type or category of the foreground software application, calendar events, holidays, geolocations, and the like.

20 Claims, 5 Drawing Sheets

(56) References Cited

U.S. PATENT DOCUMENTS

| | | |
|---|---|---|
| 10,187,872 B2 | 1/2019 | Cho et al. |
| 10,212,570 B1 | 2/2019 | Ramalingam |
| 10,778,833 B2 | 9/2020 | Yalamanchili |
| 2002/0087649 A1 | 7/2002 | Horvitz |
| 2004/0127197 A1 | 7/2004 | Roskind |
| 2006/0240803 A1 | 10/2006 | Valeriano et al. |
| 2007/0014280 A1 | 1/2007 | Cormier et al. |
| 2007/0021108 A1 | 1/2007 | Rocking et al. |
| 2007/0055770 A1 | 3/2007 | Karmakar et al. |
| 2010/0281409 A1 | 11/2010 | Rainisto et al. |
| 2011/0289451 A1 | 11/2011 | Fischer |
| 2013/0040610 A1 | 2/2013 | Migicovsky et al. |
| 2014/0160280 A1 | 6/2014 | Rodriguez et al. |
| 2014/0282003 A1 | 9/2014 | Gruber et al. |
| 2015/0179087 A1 | 6/2015 | Chen et al. |
| 2015/0242062 A1 | 8/2015 | Mehta et al. |
| 2015/0347075 A1 | 12/2015 | Levesque et al. |
| 2017/0064412 A1* | 3/2017 | Taxier ................ H04N 21/4882 |
| 2017/0093766 A1 | 3/2017 | Nagaralu et al. |
| 2017/0257844 A1* | 9/2017 | Miller ..................... G08B 6/00 |
| 2017/0286614 A1 | 10/2017 | Morris et al. |
| 2017/0289954 A1 | 10/2017 | Mese et al. |
| 2017/0316320 A1* | 11/2017 | Jamjoom ................ H04L 51/24 |
| 2018/0188935 A1 | 7/2018 | Singh et al. |
| 2018/0270179 A1 | 9/2018 | Wren et al. |
| 2018/0359207 A1 | 12/2018 | Chatterjee et al. |
| 2019/0289124 A1 | 9/2019 | Yalamanchili |

* cited by examiner

MOBILE COMPUTING DEVICE NOTIFICATION MODE DETERMINATION

CROSS-REFERENCE TO RELATED APPLICATIONS

This application is a continuation of U.S. patent application Ser. No. 15/920,079, now U.S. Pat. No. 10,778,833, entitled "MOBILE COMPUTING DEVICE NOTIFICATION MODE DETERMINATION" and filed on Mar. 13, 2018, which is hereby incorporated by reference herein in its entirety.

BACKGROUND

Generally described, computing devices can be used to exchange information via a network. For example, mobile computing devices may utilize a network provided by a wireless service provider, or may utilize networks provided by device users or third parties, to facilitate the exchange of information. Mobile computing devices may thus be used to facilitate interactions between a user of a mobile computing device and other users, other devices, or software applications, which may be executed on the mobile computing device or another computing device.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Generally described, aspects of the present disclosure relate to the operation of mobile computing devices. More specifically, aspects of the present disclosure are directed to systems, methods, and computer-readable media related to managing and customizing notifications that are generated by a mobile computing device. A mobile computing device may generate notifications to inform a device user of events related to operation of the mobile device or execution of software applications on the mobile device. Illustratively, such events can include, but are not limited to, an incoming telephone call, upcoming appointment, receipt of a text message or social media interaction, that the user is approaching a waypoint or other geographic feature (e.g., driving instructions to turn at an approaching intersection), that an alarm or timer has reached its appointed time, application-specific notifications (e.g., an account statement is available, a new game level has been downloaded, etc.), and other such notifications.

As mobile computing devices are associated with additional functionality, the quantity and frequency of notifications provided to users increases as well. To assist users with managing notifications, mobile computing devices may be configured with management level functions, such as "do not disturb" or "airplane mode" functions, that disable some or all notifications associated with individual user devices. Such management level functions may be configured, for example, by an operating system on the mobile computing device. The mobile operating system, or individual software applications ("apps") on the mobile computing device, may also allow users to enable or disable notifications on an app-by-app basis. However, these approaches provide only a limited degree of control over notifications in terms of fully enabling or fully disabling notifications at an application or mobile device level. Uses of mobile computing devices may therefore receive unwanted notifications, or may receive notifications at inconvenient times or in inconvenient ways. For example, in some embodiments, a user may be accessing a software application and receive a notification related to another software application that either interferes with or inhibits the currently desired functionality.

To address the above-identified issues, a notification mode determination service may be implemented on a mobile computing device. In various aspects, the notification mode determination service may enable additional control over the presentation of notifications on a mobile device or set of mobile devices. For example, the notification determination service can configure whether, when, and how notifications are presented on the mobile computing device. In another example, the notification mode determination service can automatically determine how various notifications will be presented to the user based on notification criteria and historical responses to notifications. The functionality of the mobile computing device may therefore be improved by more effectively managing notifications, thereby reducing conflicts in the operation of software applications on the mobile computing device while improving receipt of desired notifications.

It will be understood that the notification mode determination service described herein addresses a technical problem that specifically arises in the realm of computer networks and, in particular, addresses a problem that arises in the realm of network-connected mobile computing devices. It will further be understood that the technical solution described herein is not analogous to any practice that occurred prior to filing of the present application, and that the notification mode determination service improves the performance of a mobile computing device at the task of displaying relevant information. By implementing the notification mode determination service, a mobile computing device may identify and present relevant information more quickly and efficiently, thereby reducing the amount of computing resources (e.g., memory, processing power, bandwidth, etc.) required to perform this task.

The foregoing aspects and many of the attendant advantages will become more readily appreciated as the same become better understood by reference to the following detailed description, when taken in conjunction with the accompanying drawings.

Figure 1:
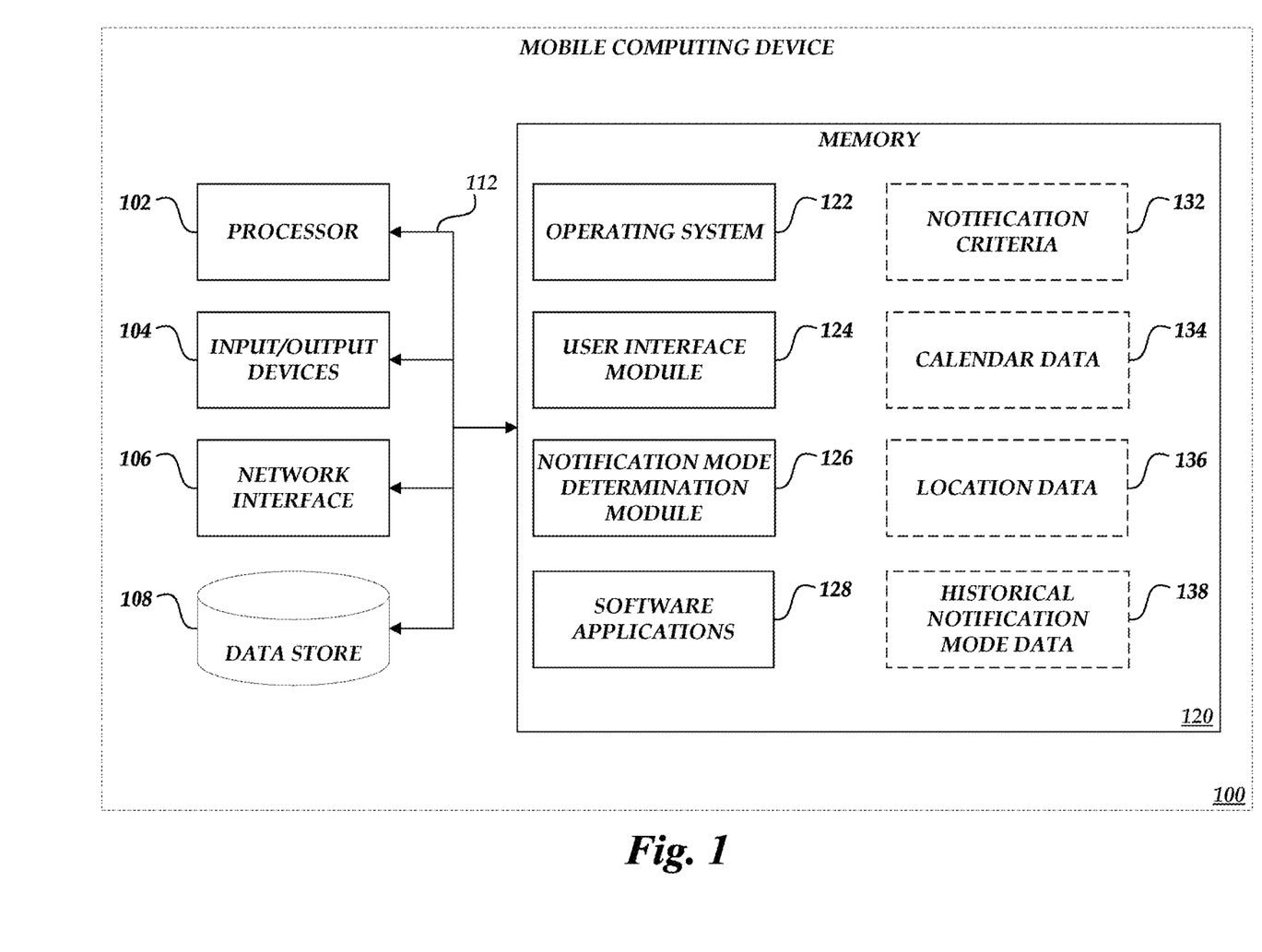
FIG. 1 is a functional block diagram depicting an example mobile computing device for delivering notifications and monitoring responses to notifications in accordance with aspects of the present disclosure.

FIG. 1 is a functional block diagram depicting a general architecture of a mobile computing device 100, which includes an arrangement of computer software and hardware components that may be used to implement aspects of the present disclosure. The mobile computing device 100 may include more (or fewer) elements than those shown in FIG. 1. It is not necessary, however, that all of these elements be shown in order to provide an enabling disclosure.

As illustrated, the mobile computing device 100 includes a processor 102, input/output devices 104, a network interface 106, and a data store 108, all of which may communicate with one another by way of a communication bus 112. The network interface 106 may provide connectivity to one or more networks or computing systems and, as a result, may enable the mobile computing device 100 to receive and send information and instructions from and to other computing systems or services. In some embodiments, the notification mode determination module 126 may be configured to process notification requests received via the network interface 106.

The processor 102 may also communicate to and from a memory 120. The memory 120 may contain computer program instructions (grouped as modules or components in some embodiments) that the processor 102 may execute in order to implement one or more embodiments. The memory 120 generally includes RAM, ROM, and/or other persistent, auxiliary, or non-transitory computer readable media. The memory 120 may store an operating system 122 that provides computer program instructions for use by the processor 102 in the general administration and operation of the mobile computing device 100. The memory 120 may further store specific computer executable instructions and other information (which may be referred to herein as "modules") for implementing aspects of the present disclosure. For example, the memory 120 may include a user interface module 124, which may perform various operations with regard to displaying the user interfaces described herein. For example, the user interface module 124 may generate all or part of the user interfaces described with reference to FIGS. 4A-4B. As a further example, the memory 120 may include a notification mode determination module 126, which may implement aspects of the present disclosure such as carrying out a notification mode determination routine 200 and/or a notification mode criteria determination routine 300, as described in more detail below with reference to FIGS. 2 and 3.

In some embodiments, the memory 120 may further include software applications 128, which may perform various functions including generating notification requests. In various embodiments, the software applications 128 may include third-party applications as well as applications that are native to the mobile computing device 100. For example, the software applications 128 may include geolocation apps, timer apps, calendar apps, messaging apps, social media apps, games, e-commerce apps, and the like. In further embodiments, the memory 120 may include information regarding the software applications 128, such as information identifying a particular software application 128 as being in the foreground, or information associating software applications 128 with categories.

The memory 120 may further include notification criteria 132, calendar information 134, geolocation information 136, and historical notification response data 138, which may be loaded into the memory 120 as various operations are performed. In some embodiments, the notification criteria 132, calendar information 134, geolocation information 136, and historical notification response data 138 may be obtained from the data store 108. In other embodiments, some or all of the notification criteria 132, calendar information 134, geolocation information 136, and historical notification response data 138 may be obtained from external data stores via the network interface 106, or may be obtained via the input/output devices 104.

While the operating system 122, user interface module 124, and notification mode determination module 126 are illustrated as distinct modules in the memory 120, in some embodiments, one or more of the user interface module 124, and notification mode determination module 126 may be incorporated as a module in the operating system 122 or another application or module, and as such, separate modules may not be required to implement some embodiments.

It will be recognized that many of the components described in FIG. 1 are optional and that embodiments of the mobile computing device 100 may or may not combine components. Furthermore, components need not be distinct or discrete. Components may also be reorganized. For example, the mobile computing device 100 may be represented in a single physical device or, alternatively, may be split into multiple physical devices. In some embodiments, components illustrated as part of the mobile computing device 100 (such as the input/output devices 104) may additionally or alternatively be included in other computing devices, such that some aspects of the present disclosure may be performed by the mobile computing device 100 while other aspects are performed by another computing device.

Figure 2:
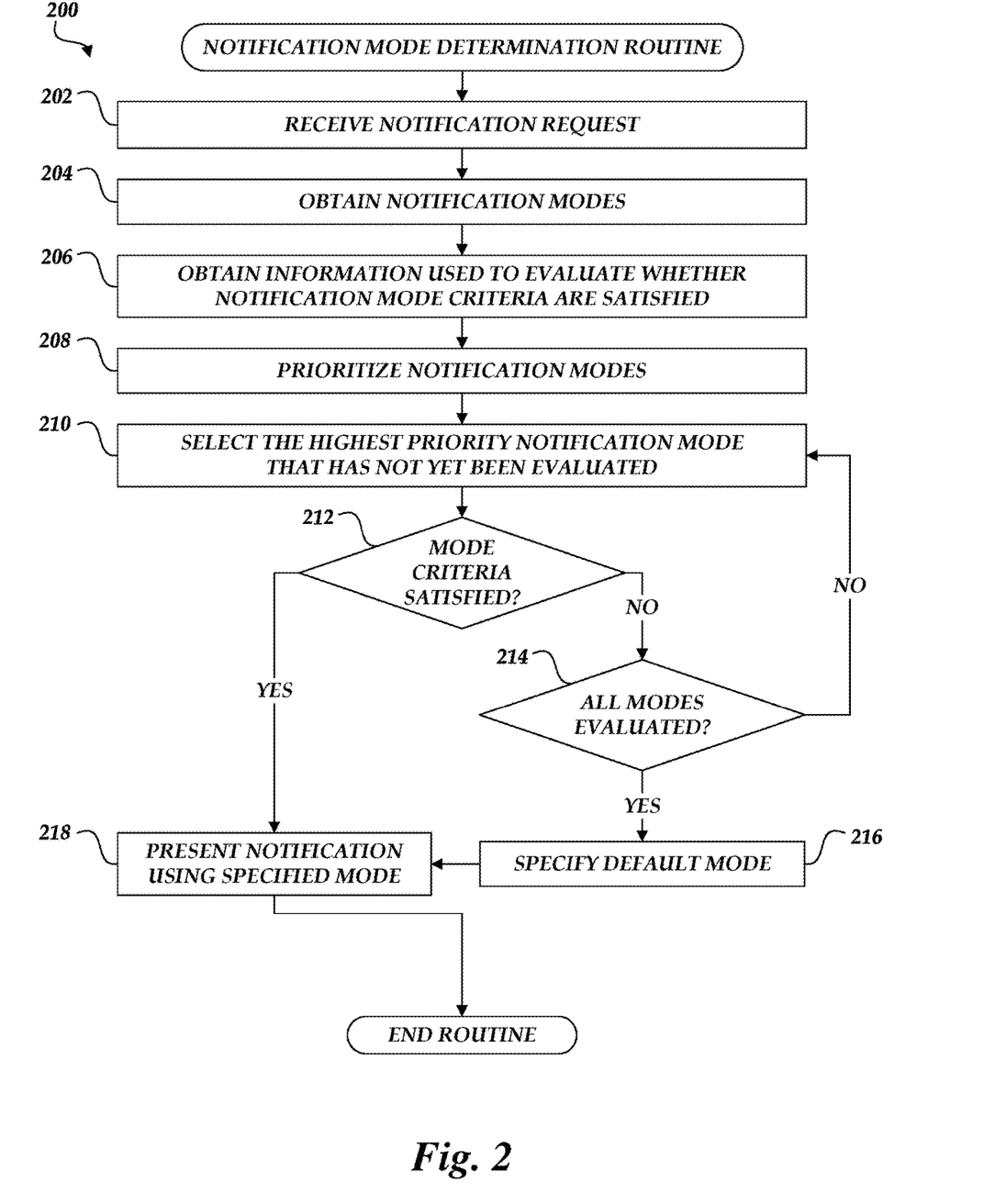
FIG. 2 is a flow diagram depicting an illustrative notification mode determination routine that may be implemented by a notification mode determination service in accordance with aspects of the present disclosure.

FIG. 2 is a flow diagram depicting an illustrative notification mode determination routine 200 that may be implemented in accordance with aspects of the present disclosure. The notification mode determination routine 200 may be implemented, for example, by the mobile computing device 100 of FIG. 1, by a module or component of the mobile computing device 100 (e.g., the notification mode determination module 126), or by another computing device.

At block 202, a request to deliver a user notification is received. Illustratively, the request may include information such as a source of the user notification, a type or category of the notification message (e.g., calendar events, driving instructions, etc.), a priority, information identifying a software application, or other such information. The request may further include content, such as text, images, audio, video, interactive media, links, buttons, prompts, user interface controls, and the like. In some embodiments, the notification request may be received from an external source. For example, a request may be received from a wireless service provider via a wireless telecommunications network to notify the user of an incoming telephone call. As a further example, a request may be received from an external device (e.g., a "smart" doorbell) via Wi-Fi®, Bluetooth®, or other wireless or wired network to notify the user of an event associated with the external device. Still further, a request may be received to display a notification associated with a message pushed or pulled from an external server (e.g., a status update from a package tracking service). In other embodiments, the notification request may be generated locally. For example, a notification request may be generated by a software application 128 that is executing on the mobile computing device 100, such as a social media application, an application that provides walking or driving directions, or a calendar application.

At block 204, user notification modes are obtained. User notification modes generally include one or more types of feedback that may be applied, as well as one or more criteria for determining whether to apply them. For example, the user notification mode may include criteria that are satisfied when a media player application is executing in the foreground on the mobile computing device. The user notification mode may further identify a particular type or mode of feedback to use (or not use) when delivering a notification under such conditions. Illustratively, the types of feedback may include, for example, audio feedback, visual feedback, haptic feedback (e.g., vibrations, pulses, taps, and the like), or combinations thereof. In some embodiments, a "silent" notification mode may enable visual and/or haptic feedback while disabling or setting a maximum threshold level for audio feedback. In other embodiments, a user notification mode may specify that one or more types of feedback are to be provided initially, and then additional types of feedback are to be provided according to whether a criterion is satisfied. For example, the user notification mode may specify that haptic and visual feedback are to be provided initially, and then audio feedback is to provided (and, in some embodiments, may gradually increase in volume) if the user does not respond.

In some embodiments, the user notification mode may be a deferred notification mode, which may specify that one or more notification feedback should be deferred until a future time or until some other criterion or criteria has been satisfied. For example, the mode may specify that notifications should be deferred until a foreground application on the mobile computing device is no longer in the foreground. In such an example, a user may continue to participate in a videoconference, watch a movie, play a game, share the user's screen, and so forth without interruption from notifications.

As further examples, the criteria associated with a deferred notification mode may specify that feedback should be silent or deferred if the user's calendar indicates the user is in an important meeting, if the mobile computing device is at a particular location (e.g., a school or workplace), if the device's position changes and rate of movement indicate the user is driving or flying, and so forth. The criteria may further specify multiple conditions or exceptions. For example, the criteria may specify that notifications should be silent if the mobile computing device is at a work location, but audible if the current time is between noon and 1:00 p.m.

In some embodiments, the notification modes can also include information that establishes a (relative or absolute) priority between different notification modes, and thereby establishes which notification modes should take precedence over others. For example, a first notification mode can specify that notifications should be deferred if the location of the mobile device is associated with a "home" designation and the current time is between 9:00 p.m. and 6:00 a.m., and a second notification mode can specify that notifications should be displayed if the foreground application on the mobile computing device is a web browser. A prioritization may be obtained that causes the second mode to take precedence over the first, such that the user will receive notifications if browsing the web at home after 9:00 p.m., but otherwise notifications will be deferred until 6:00 a.m.

In some embodiments, a user notification mode can specify a category of application. For example, a notification mode may specify that notifications should provide only haptic feedback when a health and fitness application is in the foreground. The user may thus use a variety of health and fitness applications without needing to specify notification settings on an app-by-app basis. In further embodiments, a user notification mode may specify criteria that are satisfied based on a source of the notification, content of the notification, or other characteristics of the notification that is requested at block 202.

At block 206, information may be obtained from various sources to be used when evaluating the criteria obtained at block 204. For example, the user's calendar may be obtained from a data store (e.g., data store 108 of FIG. 1), information about a foreground application may be obtained from an operating system (e.g., operating system 122), geolocation data may be obtained from a geolocation sensor, the current date and time may be obtained, and so forth. As described in more detail below, the obtained information may be used to determine, for example, whether one or more of the criteria obtained at block 204 are satisfied. In some embodiments, a determination may be made as to what information is required to evaluate the criteria, and information may be obtained accordingly. One skilled in the relevant art will appreciate that the information utilized to evaluate the criteria is not limited to the illustrative examples in the present application. Additionally, the information obtained from the various sources does not necessarily have to match the criteria such that additional or alternative information may be collected for later use or, in some cases, may not be utilized directly to evaluate the criteria.

At block 208, in some embodiments, the user notification modes may be prioritized. As described above, user notification modes may include information that establishes a relative or absolute priority between different modes, and this information may be used to establish whether or which notification modes should take precedence. In some embodiments the prioritization may rank the user modes, such that a particular mode is evaluated first, another is evaluated second, and so forth. In other embodiments, the prioritization may specify buckets or categories of priorities (e.g., high, medium, and low priorities). For example, a prioritization may be determined specifying that user notification modes A, B, and C can be evaluated in any order, but that all three of them should be evaluated before any of modes D, E, and F are evaluated.

At block 210, a user notification mode may be selected. In embodiments where the notification modes are prioritized, the selected user notification mode may be the highest-priority mode that has not yet been evaluated. In other embodiments, a user notification mode may be selected arbitrarily, or may be selected according to criteria such as a most recently applied notification mode, most frequently used notification mode, and so forth.

At decision block 212, a determination may be made as to whether the criteria associated with the selected user notification mode are satisfied. For example, the user notification mode may specify that notification feedback should be deferred if a particular application (e.g., a game) is in the foreground, or that only visual feedback should be applied if the device's built-in camera application is in the foreground. It will be understood that the notification mode determination routine 200, and not the foreground application, determines whether a notification mode based on the foreground application applies and takes precedence. For example, two different notification requests may result in different types of feedback being provided, even though both requests are received while the same application is in the foreground, because the second notification request satisfied the criteria of a higher-priority notification mode.

If the determination at decision block 212 is that the criteria are satisfied for the selected user notification node, then the notification mode determination routine 200 branches to block 218, where the requested notification may be presented in the notification mode specified by the satisfied criterion.

If the determination at decision block 212 is that the criteria for the selected user notification mode are not satisfied, then at decision block 214 a determination may be made as to whether all of the notification modes have been evaluated. If not all of the notification modes have been evaluated, then the notification mode determination routine 200 returns to block 210, selects the next-highest-priority user notification mode, and iterates through blocks 210-214 until either a user notification mode is found having satisfied criteria, or all of the user notification modes have been evaluated. For example, a second user notification mode may specify that a haptic feedback mode should be used if the foreground application is a social networking application. If the determination at decision block 212 is that the criterion is satisfied, then the notification mode determination routine 200 branches to block 218, where the requested notification may be presented using the type(s) of feedback specified by the app category notification mode.

As a further example, a user notification mode may specify that a screen sharing function is active on the mobile computing device. A screen sharing function may illustratively cause a display of the mobile computing device to be shared or displayed on another computing device or application, such as a projector, television, or videoconferencing software. If the determination at decision block 212 is that the criteria are satisfied, then the notification mode determination routine 200 branches to block 218, where the requested notification may be presented using the types of feedback (e.g., deferred, haptic only, home screen display only) specified by the screen sharing notification mode.

As a still further example, a user notification mode may specify that a calendar event on the user's calendar spans the current time, that the current date is a particular day of the week or holiday (whose calendar date may vary), that a current event on the user's calendar falls within a particular category of events (e.g., work meetings or social events), includes a particular event participant, takes place at a particular event location, or other related criteria.

Still further, a user notification mode may specify a geolocation-related criterion. For example, the criterion may specify that certain or all notifications should be silent if the mobile computing device is at a library. As a further example, the criterion may specify that certain or all notifications should be deferred if the device is at a movie theater or concert hall. As still further examples, the criterion may specify a notification mode if the device is moving at a high rate of speed (e.g., a rate associated with driving or flying), moving along a particular path (e.g., a train or subway track), entering or leaving a particular region, within range of a particular network (e.g., a Wi-Fi network associated with a home location), etc.

It will be understood that many other criteria and determinations are within the scope of the present disclosure. For example, a determination may be made as to whether the current date is a public holiday, and if so a particular notification mode may be applied. As further examples, notification modes may be determined based on the sender or content of the notification, the current time and/or day of the week, the number of notifications received within a particular time period, and so forth.

If the determination at decision block 214 is that all notification modes have been evaluated (and that none of the notification mode criteria have been satisfied), then at block 216 a default notification mode may be specified. In some embodiments, the default notification mode may be to continue using a current notification mode. In further embodiments, a default criterion may be obtained and may be assigned a lowest priority, such that the default criterion is always satisfied, but is only invoked if no other criterion is satisfied. The default criterion and/or default mode may be obtained, for example, at block 216, block 204, or prior to execution of the routine 200. In some embodiments, the notification mode determination routine 200 may delegate presentation of the notification to the operating system, in which case the notification mode determination routine 200 may end at block 216.

At block 218, as discussed above, the requested notification is processed using the determined notification mode. In some embodiments, the carrying out of block 218 may be delayed in accordance with a deferred notification mode. For example, the presentation of the requested notification may be delayed until a foreground application has been relegated to the background, until the mobile computing device has left a particular geolocation, or until another deferred notification criterion has been satisfied. In such embodiments, a determination may be made as to whether the criterion has been satisfied, and if not the notification mode determination routine 200 may iterate, sleep, or otherwise delay presentation of the notification until the appointed time or condition, and then present the notification once the criterion has been satisfied. In some embodiments, the notification mode may specify that the notification is not to be displayed at all, and block 218 may be omitted. In other embodiments, the content of the notification may be transformed according to the determined notification mode. For example, a notification containing text may be converted from visual feedback to audio feedback using a text-to-speech routine. As further examples, a notification containing text and images may be simplified to include only text, or an audio notification may be transformed into haptic feedback (which may or may not be based on the audio). The notification mode determination routine 200 then ends.

In various embodiments, the blocks of the notification mode determination routine 200 may be combined, omitted, or carried out in various orders. For example, blocks 202, 204, 206, and 208 may be carried out in any order. As a further example, blocks 204 and 206 may be combined. The notification mode determination routine 200 is thus understood to be illustrative and not limiting.

Figure 3:
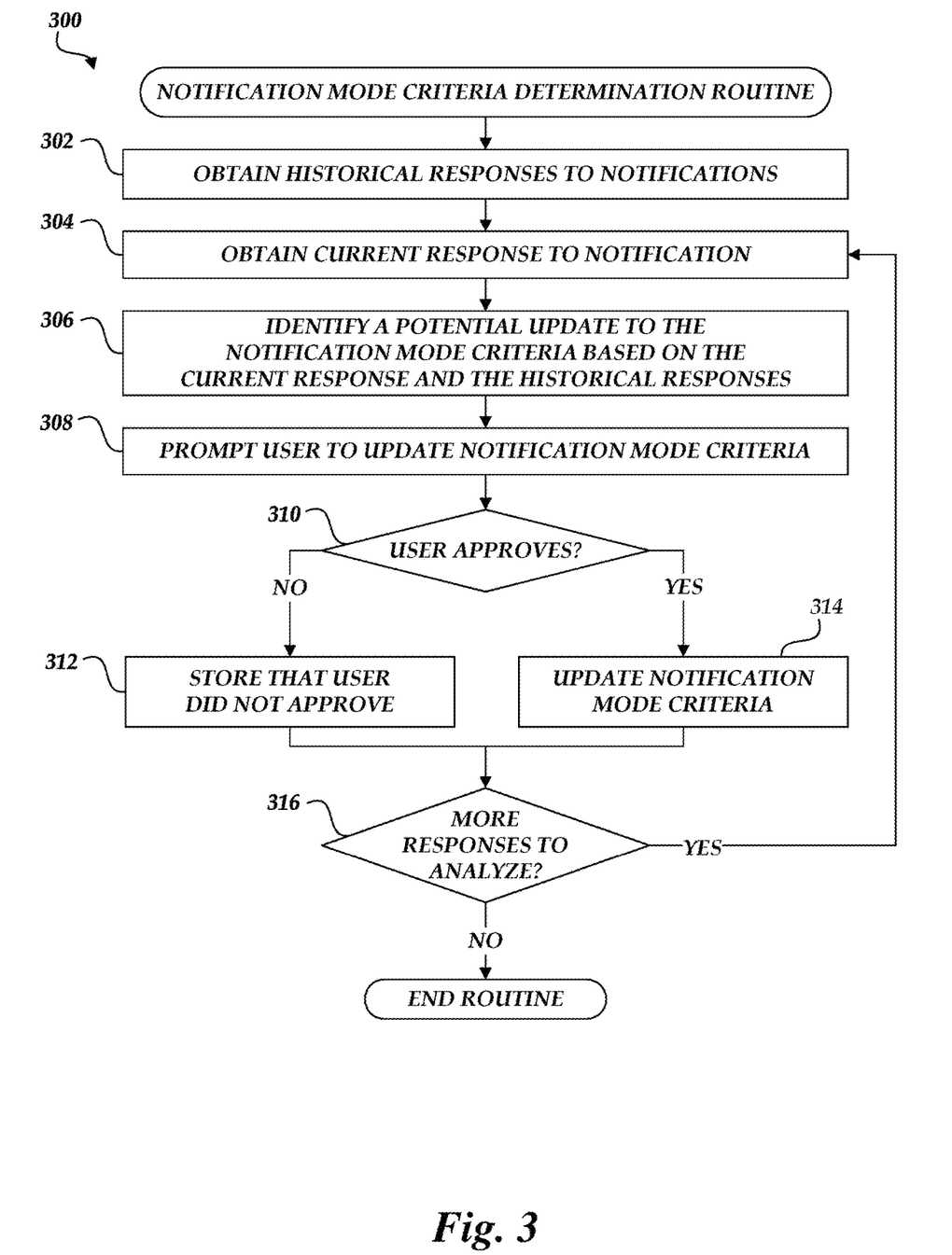
FIG. 3 is a flow diagram fixing an illustrative notification mode criteria determination routine that may be implemented by a notification mode determination service in accordance with aspects of the present disclosure.

FIG. 3 is a flow diagram depicting an illustrative notification mode criteria determination routine 300 that may be implemented in accordance with aspects of the present disclosure. The notification mode criteria determination routine 300 may be implemented, for example, by the mobile computing device 100 of FIG. 1, by a module or component of the mobile computing device 100 (e.g., the notification mode determination module 126), or by another computing device.

At block 302, historical responses to displayed notifications may be obtained. Illustratively, the historical responses may be obtained from a data store, such as the data store 108 of FIG. 1. Generally described, historical responses may include information that attempts to characterize an affinity for a user or groups of users to perform defined actions in response (at least in part) to notifications. Examples of historical information include, but are not limited to, a measure of response time for user responses to a notification, whether the user changed the foreground application within a specified time interval of receiving the notification, whether the user changed an audio volume or other setting on the mobile computing device, including a measure of the amount changed, whether the user performed an action associated with receiving the notification, or other such responses. In various embodiments, the historical responses may be the responses of a particular user, a particular group or demographic of users, responses to particular notifications, or other sets of responses.

At block 304, information regarding a response to a current notification may be obtained. In some embodiments, the response may correspond to a notification displayed by the notification mode determination routine 200 of FIG. 2. For example, the notification mode determination routine 200 and the notification mode criteria determination routine 300 may be carried out wholly or partially in parallel each time a notification request is processed, and block 304 may be carried out after block 218. In other embodiments, information regarding responses to a number of recent notifications may be received and periodically processed as part of integrating the latest responses into the set of historical responses. In further embodiments, current or recent responses to notifications may be stored with the historical responses prior to execution of the notification mode criteria determination routine 300, and all or part of blocks 302 and 304 may be combined.

At block 306, the information obtained at block 302 and 304 may be analyzed to identify a potential update to the notification mode criteria, which may be characterized as a correlation between user activity in the historical information and the notifications that were displayed. Illustratively, a pattern may be identified with regard to received notifications and corresponding responses. For example, it may be determined that the user frequently mutes the mobile computing device's audio output after receiving a notification during a calendared meeting. In various embodiments, a determination may be based upon a threshold number of instances of a user activity, a threshold percentage of notifications that are associated with the user activity (e.g., based on an amount of time elapsed between the notification and the activity), a statistically significant number or frequency of activities, a categorization of the notification, trend analysis (e.g., that the user activity is occurring more often or less often), or other techniques. In some embodiments, machine learning may be used to generate a model based on the historical responses to displayed notifications. The model may then be validated by using it to predict the current response. For example, a model may be trained on the historical data, and may predict that the user will respond to a notification from a particular source by dismissing it without reading the content (as determined by the amount of elapsed time between display of the notification and its dismissal). The model's accuracy may then be tested upon display of the next notification from the identified source.

A potential update to notification mode criteria, or a new notification mode, may thus be identified. For example, a notification mode may be identified in which notifications displayed during meetings are displayed using visual or haptic notification modes only. As a further example, it may be determined that the user tends to quickly dismiss notifications that are displayed while a videoconferencing application is in the foreground. A potential criterion for a deferred notification mode may thus be identified, and may specify the deferred notification mode if the videoconferencing application is in the foreground. In various embodiments, machine learning, pattern recognition algorithms, and other such techniques may be used to analyze the response data and identify potential updates to the notification mode criteria.

In some embodiments, the collection of information related to a response to a current notification at block 304 may be omitted, and the notification mode criteria determination routine 300 may process the historical response information collected at block 302. For example, the notification mode criteria determination routine 300 may process a batch of historical responses to identify an initial set of notification mode criteria or may process historical responses in an offline mode rather than processing individual user responses as they are obtained and comparing them to historical responses. In other embodiments, the analysis at block 306 may be weighted to favor more recent responses to notifications collected at block 304, such that a change in user behavior may be detected, and the notification mode criteria may be updated accordingly. In further embodiments, the collection of historical information at block 302 may be omitted, and the analysis at block 306 may be based on the collection of information related to a response to a current notification at block 304.

In some embodiments, at block 308, the user may be prompted to approve or modify the potential updates to the notification mode criteria. For example, the notification mode criteria determination routine 300 may detect that the user frequently misses (e.g., takes a long time to acknowledge) notifications that are displayed when the user is at a work location, and may propose an update to the criteria to display notifications using an audio notification mode under the circumstances. In some embodiments, the user may modify the proposed update to include, for example, additional feedback types or criteria. For example, the notification mode criteria determination routine 300 may propose an updated notification mode that displays audio feedback only when a social media application is in the foreground, and the user may modify the proposed mode to use audio and haptic feedback.

At decision block 310, a determination may be made as to whether the user approves of the proposed update to the notification mode criteria. If not, then at block 312 information indicating that the user did not approve may be stored. This information may be used, for example, in order to prevent the notification mode criteria determination routine 300 from prompting the user again with the same proposed update for a given period of time or until a certain behavior trend is recognized. If the determination is that the user approves, then at block 314 the notification mode criteria may be updated with a new, changed, or deleted criterion.

The notification mode criteria determination routine 300 then continues at decision block 316, wherein determination may be made as to whether there are more notification responses to be analyzed. For example, the determination may be that the mobile computing device 100 is in an active mode, and thus further user responses to notifications may be obtainable as they occur. If so, then the notification mode criteria determination routine 300 branches to block 304, awaits further responses to notifications, and iterates until there are no further responses to analyze. In some embodiments, all or part of the notification mode criteria determination routine 300 may be carried out in conjunction with the routine 200 of FIG. 2, such that the presentation of a notification at block 220 is followed by obtaining a response to the same notification at block 304. In other embodiments, as described above, the notification mode criteria determination routine 300 may be carried out to generate an initial set of notification mode criteria, which may then be obtained and used by the routine 200. Still further, in some embodiments block 316 may be carried out prior to block 308, and a number of potential updates may be identified before the user is prompted to update the notification mode criteria. The user may thus be presented with several updates to consider (and may approve all, some, or none of them), or may be presented with a "best" potential update or updates that is determined based on multiple responses to notifications.

In various embodiments, the blocks of the notification mode criteria determination routine 300 may be combined, omitted, or carried out in various orders. For example, blocks 308, 310, and 312 may be omitted, and the notification mode criteria determination routine 300 may thus be carried out without user interaction. As a further example, blocks 302 and 304 may be combined. Still further, block 306 may be carried out prior to block 304, and the user response received at block 304 may be used to validate a potential update to the notification mode criteria. The notification mode criteria determination routine 300 is thus understood to be illustrative and not limiting.

Figure 4A:
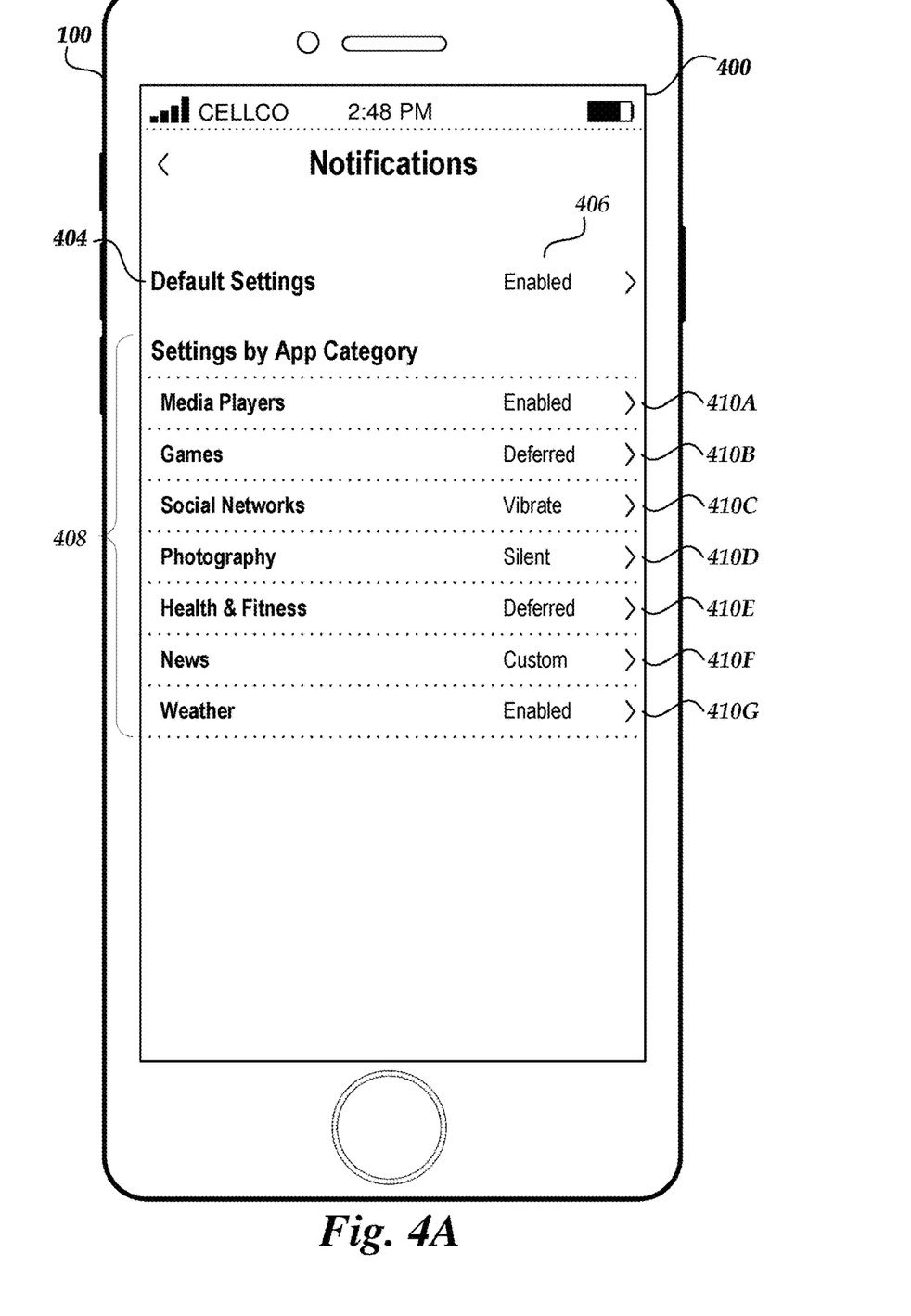
FIGS. 4A and 4B are pictorial diagrams depicting illustrative user interfaces for displaying and modifying notification mode criteria in accordance with aspects of the present disclosure.

FIG. 4A is a pictorial diagram of an illustrative user interface 400 for displaying and modifying notification mode criteria in accordance with aspects of the present disclosure. The user interface 400 may be displayed, for example, on a screen or other display element of a computing device, such as the mobile computing device 100 depicted in FIG. 1. As illustrated, the user interface 400 may include a default notification mode selector 404, whose selected value 406 may indicate that notifications are enabled by default. In some embodiments, notifications may be described as "enabled" when all notification modes are permitted, and may otherwise be described in terms of which modes are allowed or restricted. For example, a "vibrate" setting may indicate that visual and haptic modes are permitted, while a "silent" setting may indicate that only a visual notification mode may be used.

The user interface 400 may further include app category settings 408, which may enable display and modification of category-specific notification mode settings 410A-G. For example, a "Media Players" category setting 410A may display that notifications are enabled when an application in the "Media Players" category is in the foreground. As a further example, a "Social Networks" category setting 410C may display that notifications are limited to a "vibrate" mode, which may include both visual display and haptic feedback. User selection of one of the category settings 410A-G may cause display of a second user interface (such as user interface 450, as described in more detail below with reference to FIG. 4B) that enables changing the notification mode setting for the selected category. In some embodiments, the user interface 400 may enable setting per-app overrides of category-specific notification mode settings. For example, the user interface 400 may enable limiting the "Social Networks" category to "vibrate" notifications, but allowing a particular social networking app to override this setting and provide audio notifications.

In various embodiments, the user interface 400 may include more, fewer, or different controls for displaying and/or modifying notification mode criteria. For example, the category settings 410A-G may be implemented as sliders, checkboxes, or other user interface elements. As a further example, the settings may be implemented by specifying a list of categories for which a silent mode is preferred, a list of categories for which a vibrate mode is preferred, and so forth. Still further, the user interface 400 may include additional controls for viewing or modifying the default settings. The user interface 400 depicted in FIG. 4A is thus understood to be illustrative and not limiting.

Figure 4B:
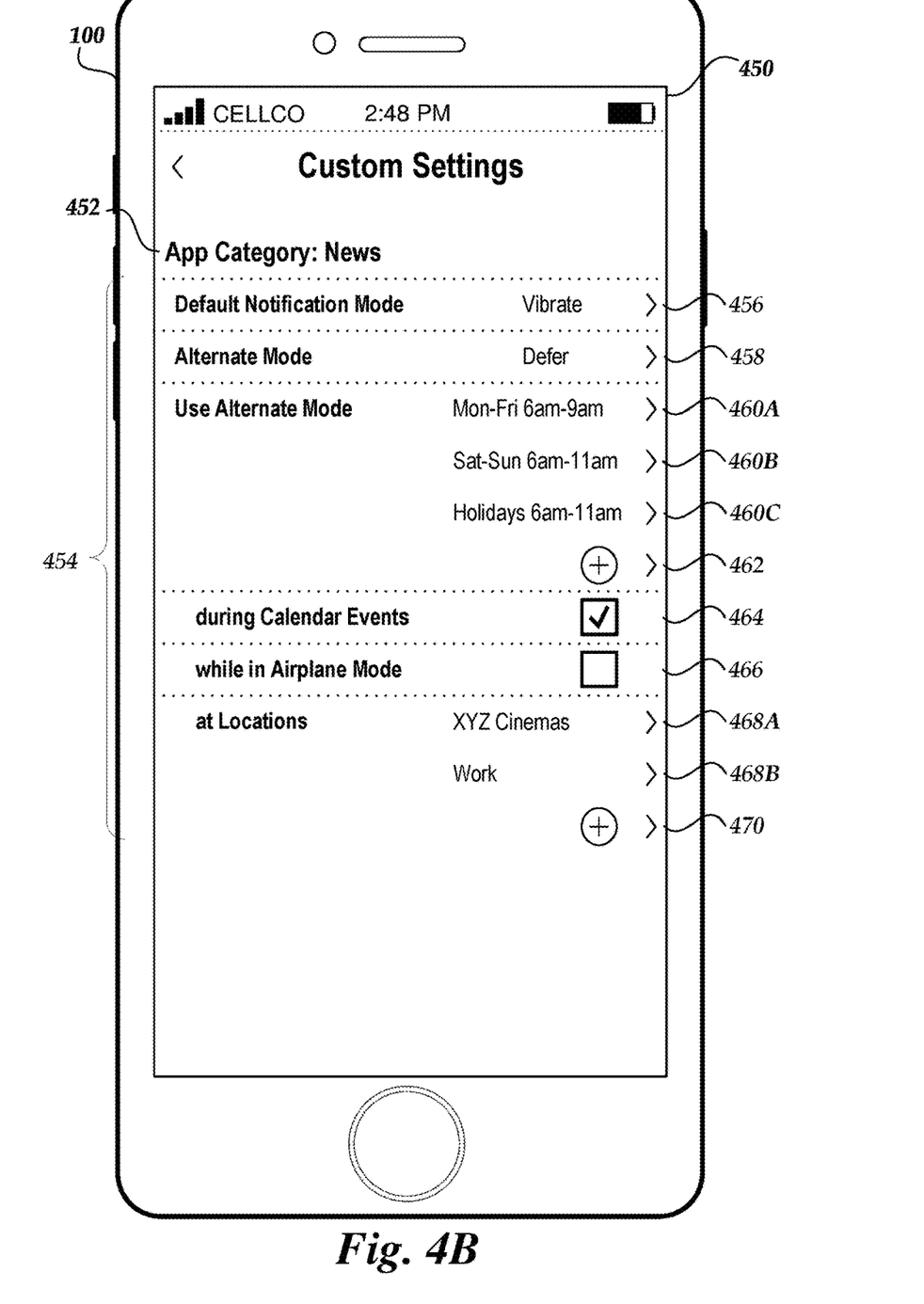

FIG. 4B is a pictorial diagram of an illustrative user interface 450 for displaying and modifying notification mode criteria for a particular application category, in accordance with aspects of the present disclosure. The user interface 450 may be displayed, for example, on a screen or other display element of a computing device, such as the mobile computing device 100 depicted in FIG. 1. In some embodiments, the user interface 450 (or a similar user interface) may be provided for displaying and modifying default notification mode settings.

As illustrated, the user interface 450 includes an application category descriptor 452. In some embodiments, the user interface 450 further includes controls for selecting or specifying which apps to include in the category. For example, the application category descriptor 452 may indicate that the displayed notification mode criteria apply to the "News" category of apps, and the user interface 450 may include checkboxes, lists, or other controls that enable user selection of apps to include in (or exclude from) the "News" category. The illustrated user interface 450 further includes category-specific notification mode settings 454. The notification mode settings 454 include a default notification mode setting 456, for which a "vibrate" (haptic feedback) mode has been selected. The default notification mode may be used, for example, if none of the criteria specified in the user interface 450 (e.g., by settings 460A-C, 464, 466, or 468A-B) are satisfied.

The notification mode settings 454 further include an alternate notification mode setting 458, which specifies that a "defer" mode should be used as the alternate mode. In some embodiments, an alternate notification mode may be specified with regard to individual criteria or sets of criteria, and an additional alternate notification mode or modes may be specified with regard to other criteria. For example, an audio notification mode may be specified when the device is at a first location, and a deferred notification mode may be specified when the device is at a second location. In other embodiments, a notification mode may be specified for each criterion (or specified for sets of criteria) rather than specifying default and alternate notification modes.

The notification mode settings 454 further include time-based criteria 460A-C, which specify days of the week and times of day at which the alternate notification mode is to be used. For example, the time-based criterion 460A specifies that the alternate (deferred) notification mode is to be used on weekdays between 6:00 a.m. and 9:00 a.m., and the time-based criterion 460B specifies that the alternate mode is to be used on weekends between 6:00 a.m. and 11:00 a.m. In some embodiments, a time-based criterion may override or be prioritized above other time-based criteria, or a more specific time-based criterion may override more general criteria. For example, criterion 460C may specify that an alternate mode is to be used on holidays between 6:00 a.m. and 11:00 a.m., and this criterion may be applied instead of the more general criterion 460A that specifies the mode used on weekdays. In various embodiments, the user interface 450 may enable sorting or otherwise specifying priorities for time-based criteria relative to each other, or may prioritize more specific criteria (e.g., ones that specify holidays or particular days) over more general criteria (e.g., ones that specify weekdays or weekends). Additionally, in some embodiments, the notification mode settings 454 may include an add time-based criterion control 462, which may enable creating additional time-based criteria.

In some embodiments, the notification mode settings 454 may include criteria based on calendar events, such as the calendar event criterion 464. The calendar event criterion 464 may allow the user to specify that the alternate notification mode is to be used when a calendar event is in progress (e.g., when the calendar event spans the time at which the notification is received or delivered). In further embodiments, the criteria may relate to events associated with a particular category, location, participant, timeframe (e.g., during business hours), or other criteria for specifying particular events or sets of events. In still further embodiments, event-based criteria may be combined with time-based criteria, location-based criteria, or other criteria, and may specify, for example, a first notification mode to use when both an event-based criterion and a location-based criterion are satisfied, a second notification mode to use when only the location-based criterion is satisfied, and so forth.

In some embodiments, the notification mode settings 454 may include criteria based on a mode or setting of the mobile computing device 100, such as an "airplane mode" that disables network communications, a virtual private network (VPN) mode, a private browsing mode, or other device setting. For example, the notification mode settings 454 may include an airplane mode setting 466, which (if selected) indicates that the alternate notification mode should be used when the device is in airplane mode. As described above, in some embodiments, the criteria based on device settings may be combined with other criteria or prioritized over other criteria.

The notification mode settings 454 may further include location-based criteria, such as location criteria 468A-B. The location criteria 468A-B may specify, for example, that a particular notification mode is to be used when the user is at a particular location, such as a movie theater, library, school, workplace, or other place. In some embodiments, a different notification mode may be specified for each location. The notification mode settings 454 may further include an add location-based criterion control 470, which may enable the user to create additional location-based criteria.

In some embodiments, the user interface 450 may enable the user to change the order in which notification mode settings 454 are displayed, and thereby indicate an order or priority in which the notification mode settings 454 should be applied. For example, the user interface 450 may allow the user to drag individual notification mode settings 454, or groups of notification mode settings 454, to rearrange them. In other embodiments, the user interface 450 may allow the user to specify, for example, a high, medium, or low priority for each of the notification mode settings 454, may allow the user to specify exceptions, or may otherwise allow the user to specify how multiple criteria are to be applied.

It will be understood that FIGS. 4A and 4B are provided for purposes of example, and that various interfaces containing more, fewer, or different elements are within the scope of the present disclosure. For example, the user interface 400 may display more or fewer category settings, or may display additional "global" or default settings. As a further example, as described above, the user interface 450 may enable specifying a priority of settings (e.g., by dragging and reordering individual setting controls or groups of controls). As a further example, the user interface 450 may enable specifying more than one alternate mode 458 and criterion 460-468.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

What is claimed is:

1. A mobile computing device comprising:
   a data store configured to store computer executable instructions; and
   a processor in communication with the data store, wherein the computer executable instructions, when executed by the processor, configure the processor to perform operations including:
   receiving, from an external source, a first request to display a notification;
   determining a priority of the first request based at least in part on priority information associated with a plurality of notification modes, wherein the priority of the first request is associated with a first user-specified criterion and a first notification mode of the plurality of notification modes;
   causing display of the notification in accordance with the first notification mode; and
   in response to determining a user preference based at least in part on a first response to the display of the notification in accordance with the first notification mode, modifying the priority information such that a priority of a second request to display the notification is associated with a second user-specified criterion and a second notification mode of the plurality of notification modes.

2. The mobile computing device of claim 1, wherein the first response to the display of the notification in accordance with the first notification mode comprises dismissal of the notification.

3. The mobile computing device of claim 2, wherein determining the user preference includes determining that the dismissal of the notification occurred within a threshold time interval of the display of the notification.

4. The mobile computing device of claim 2, wherein the second user-specified criterion specifies that a first application is executing in the foreground when the notification is displayed.

5. The mobile computing device of claim 2, wherein the second notification mode comprises a deferred notification mode.

6. The mobile computing device of claim 1, wherein determining the user preference comprises:
   identifying a plurality of responses to notifications displayed in accordance with the first notification mode while the mobile computing device is in a first geographic location, the plurality of responses including the first response; and
   determining that an average response time for the plurality of responses satisfies a threshold.

7. A computer-implemented method under control of one or more computing devices executing specific computer-executable instructions, the computer-implemented method comprising:
   receiving a request to display a first notification on a mobile computing device;
   determining that the request satisfies a first user-specified criterion;
   causing display of the first notification on the mobile computing device in accordance with a first notification mode, the first notification mode specified based on applicability of the first user-specified criterion;
   based at least in part on a response to the display of the first notification, modifying a prioritization of the first user-specified criterion and a second user-specified criterion such that the second user-specified criterion takes precedence over the first user-specified criterion; and
   causing display of a second notification on the mobile computing device in accordance with a second notification mode, the second notification mode specified based on applicability of the second user-specified criterion.

8. The computer-implemented method of claim 7 further comprising determining that an attribute of the request satisfies the second user-specified criterion.

9. The computer-implemented method of claim 7 further comprising determining that an attribute of the mobile computing device satisfies the second user-specified criterion.

10. The computer-implemented method of claim 7, wherein the first user-specified criterion comprises a first time-based criterion specifying a first time period.

11. The computer-implemented method of claim 10, wherein the second user-specified criterion comprises a second time-based criterion specifying a second time period, and wherein the second time period is shorter in duration than the first time period.

12. The computer-implemented method of claim 7, wherein the first user-specified criterion comprises a foreground application category, and wherein the second user-specified criterion comprises a first application within the foreground application category.

13. The computer-implemented method of claim 7, wherein modifying the prioritization of the first user-specified criterion and the second user-specified criterion is based at least in part on an amount of elapsed time between the display of the first notification and the response.

14. A non-transitory computer-readable medium containing computer-executable instructions that, when executed by a processor, configure the processor to perform operations including:
   receiving a request to display a first notification on a mobile computing device;
   obtaining a plurality of responses to displays of individual notifications on a set of computing devices, wherein each display of a notification on the mobile computing device is in accordance with individual criteria of a plurality of user-specified criteria;
   identifying, based at least in part on the plurality of responses, a pattern associated with responses to notifications displayed in accordance with a first user-specified criterion, wherein the first user-specified criterion is associated with a first notification mode, and wherein the request to display the first notification satisfies the first user-specified criterion;

modifying, based at least in part on the pattern, a priority of the first user-specified criterion relative to a second user-specified criterion such that the second user-specified criterion takes precedence over the first user-specified criterion, wherein the second user-specified criterion is associated with a second notification mode; and causing display of the first notification on the mobile computing device in accordance with the second notification mode responsive to a determination that the request to display the first notification satisfies the second user-specified criterion.

15. The non-transitory computer-readable medium of claim 14, wherein identifying the pattern associated with notifications displayed in accordance with the first user-specified criterion is based at least in part on applying a machine learning model trained on the plurality of responses to predict a response to the first notification.

16. The non-transitory computer-readable medium of claim 14, wherein identifying the pattern associated with responses to notifications displayed in accordance with the first user-specified criterion comprises identifying one or more of a threshold number of responses corresponding to a first user activity, a threshold percentage of responses corresponding to the first user activity, or a trend in responses corresponding to the first user activity.

17. The non-transitory computer-readable medium of claim 16, wherein the first user activity comprises one or more of dismissing a notification, muting audio output, or responding after a threshold time interval.

18. The non-transitory computer-readable medium of claim 14 containing further computer-executable instructions that, when executed by the processor, configure the processor to perform further operations including determining the second user-specified criterion based at least in part on the pattern associated with responses to notifications displayed in accordance with the first user-specified criterion.

19. The non-transitory computer-readable medium of claim 14 containing further computer-executable instructions that, when executed by the processor, configure the processor to perform further operations including causing display of a user interface that enables a user to modify a prioritization of the plurality of user-specified criteria.

20. The non-transitory computer-readable medium of claim 14, wherein the plurality of responses to displays of individual notifications on the set of computing devices is associated with a first user.

* * * * *